(12) United States Patent
Zhu

(10) Patent No.: US 11,811,082 B1
(45) Date of Patent: Nov. 7, 2023

(54) ENERGY STORAGE POWER SUPPLY

(71) Applicant: Guangdong Aoyun Technology Co., Ltd., Guangdong (CN)

(72) Inventor: Xueping Zhu, Guangdong (CN)

( * ) Notice: Subject to any disclaimer, the term of this patent is extended or adjusted under 35 U.S.C. 154(b) by 0 days.

(21) Appl. No.: 17/967,720

(22) Filed: Oct. 17, 2022

(30) Foreign Application Priority Data

Aug. 4, 2022 (CN) .......................... 202222051743.4

(51) Int. Cl.
| | |
|---|---|
| *H01M 50/256* | (2021.01) |
| *F21V 1/06* | (2006.01) |
| *F21S 9/02* | (2006.01) |
| *H01M 50/247* | (2021.01) |
| *F21V 33/00* | (2006.01) |

(52) U.S. Cl.
CPC ............. *H01M 50/256* (2021.01); *F21S 9/02* (2013.01); *F21V 1/06* (2013.01); *F21V 33/0004* (2013.01); *H01M 50/247* (2021.01); *H01M 2220/30* (2013.01)

(58) Field of Classification Search
CPC ............. H01M 50/256; H01M 50/247; H01M 2220/30; F21S 9/02; F21V 1/06; F21V 33/0004

See application file for complete search history.

(56) References Cited

U.S. PATENT DOCUMENTS 3,124,306 A * 3/1964 Schotz ...................... F21L 2/00
D26/49

\* cited by examiner

*Primary Examiner* — Cynthia K Walls

(57) ABSTRACT

The present disclosure provides an energy storage power supply, including a power supply main body and a strap, wherein the power supply main body is provided with a handle; a hanging part is arranged at the handle; the strap is detachably connected to the hanging part, so that a user can carry the energy storage power supply with the handle, and can also easily carry the energy storage power supply with the strap.

9 Claims, 4 Drawing Sheets

ENERGY STORAGE POWER SUPPLY

CROSS-REFERENCE TO RELATED APPLICATIONS

The application claims priority of Chinese patent application CN2022220517434, filed on 2022 Aug. 4 which is incorporated herein by reference in its entireties.

TECHNICAL FIELD

The present disclosure relates to the field of energy storage power supplies, and in particular, to an energy storage power supply.

BACKGROUND

Existing energy storage power supplies on the current market either have no handle, or have a handle. A user needs to have certain arm strength to carry the energy storage power supply through the handle, and the operation is labor-intensive; furthermore, the user may feel ache in the arm if the user carries the energy storage power supply with the handle for a long time, so that it is inconvenient for the user to carry the energy storage power supply for long time, particularly, it is inconvenient for the user to carry the energy storage power supply for outdoor use, which greatly affects the user experience. Therefore, there is an urgent need to provide a novel energy storage power supply that can be carried by users for a long time, so as to improve the user experience.

SUMMARY

In order to overcome the defects in the prior art, the present disclosure provides an energy storage power supply, which is conveniently carried by a user for a long time, so as to improve the experience of the user.

The present disclosure adopts the following technical solution: an energy storage power supply including a power supply main body and a strap, wherein the power supply main body is provided with a handle; a hanging part is arranged at the handle; and the strap is detachably connected to the hanging part.

Further, the hanging part includes a first hanging opening formed in one end of the handle, and a second hanging opening formed in the other end of the handle; and one end of the strap is detachably connected to the first hanging opening, and the other end of the strap is detachably connected to the second hanging opening, so as to form a hanging space for hanging by a user between the strap and the handle.

Further, one end of the strap is provided with a first hanging buckle, and the other end of the strap is provided with a second hanging buckle; one end of the strap is detachably connected to the first hanging opening through the first hanging buckle; and the other end of the strap is detachably connected to the second hanging opening through the second hanging buckle.

Further, a light-transmitting lampshade and a night lamp are further arranged on the power supply main body; the lampshade is foldable; and the night lamp is arranged in the lampshade.

Further, a longitudinal cross section of the lampshade is a waveform, and the lampshade is foldable at a wave crest and wave trough of the waveform.

Further, a flashlight is further arranged on the power supply main body, and the flashlight is used by a user for lighting.

Further, the flashlight is arranged on a side wall of the power supply main body.

Further, the handle is arranged on a top wall of the power supply main body; the night lamp and the lampshade are arranged on one side of the handle; and the night lamp and the lampshade are located above the flashlight.

Further, a storage bag is further arranged on a side wall of the power supply main body.

Further, the storage bag is a storage string bag.

The present disclosure has the beneficial effects: by the above structure, the energy storage power supply includes the power supply main body and the strap; the power supply main body is provided with the handle; the hanging part is arranged at the handle; and the strap is detachably connected to the hanging part. Therefore, a user can not only carry the energy storage power supply with the handle, but also easily carry the energy storage power supply with the strap; furthermore, the strap is connected to the hanging part at the handle, so that when slinging the energy storage power supply over the shoulder with the strap, the user can enclasp the handle under the help of an arm to fix the position of the energy storage power supply, prevent the energy storage power supply from swinging during moving of the user, and avoid the energy storage power supply from sliding off from the shoulder of the user; the stability and the safety are high; moreover, the shoulder and the arm of the user are simultaneously stressed, so that the strength of the body can be fully mobilized, and it is labor-saving; the phenomenon of partial muscle ache can be effectively prevented, and the user can carry the energy storage power supply for a long time; and when the user needs to free up hands for other work, the energy storage power can be slung across the body through the strap to prevent slipping off.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
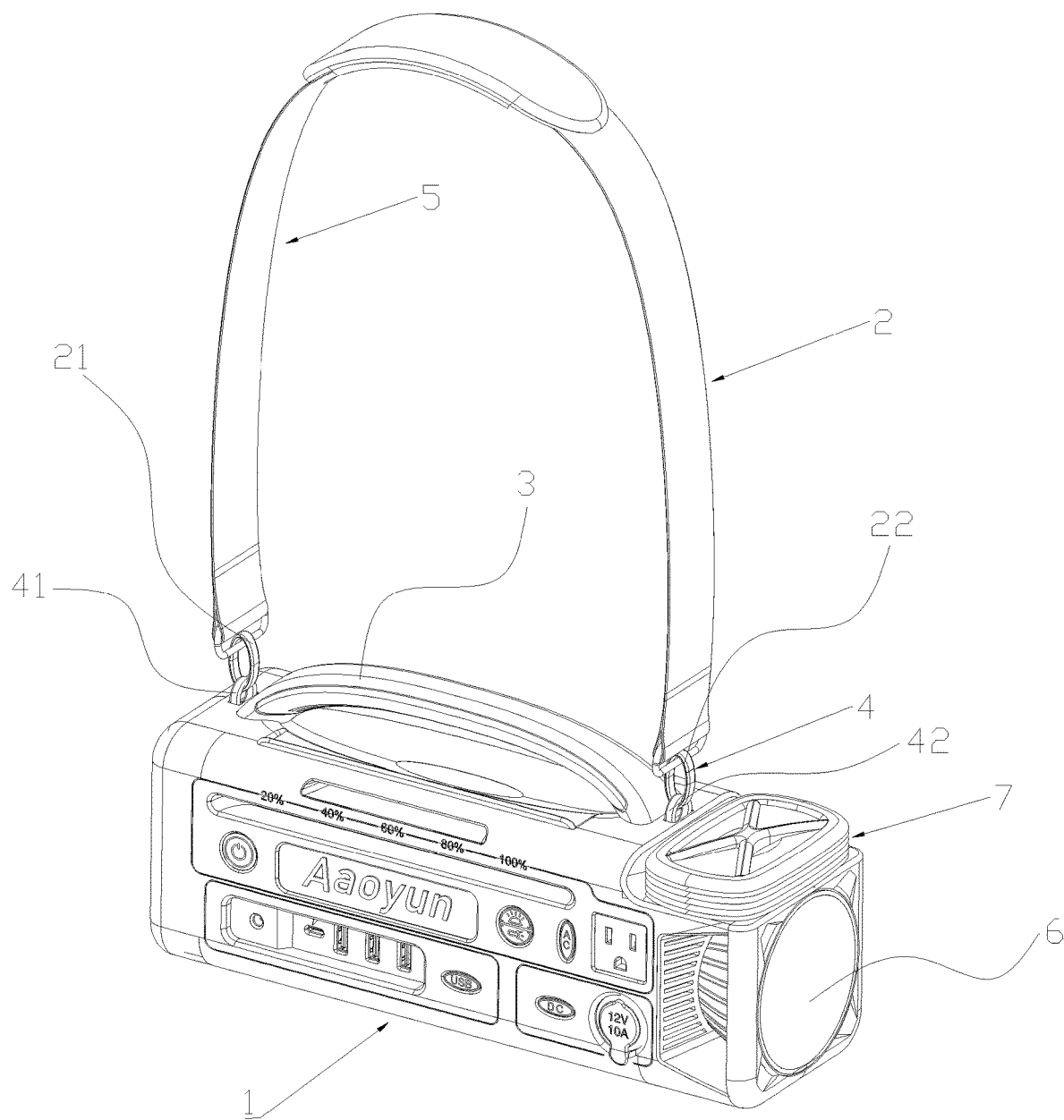
FIG. 1 is a schematic diagram of an overall structure of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
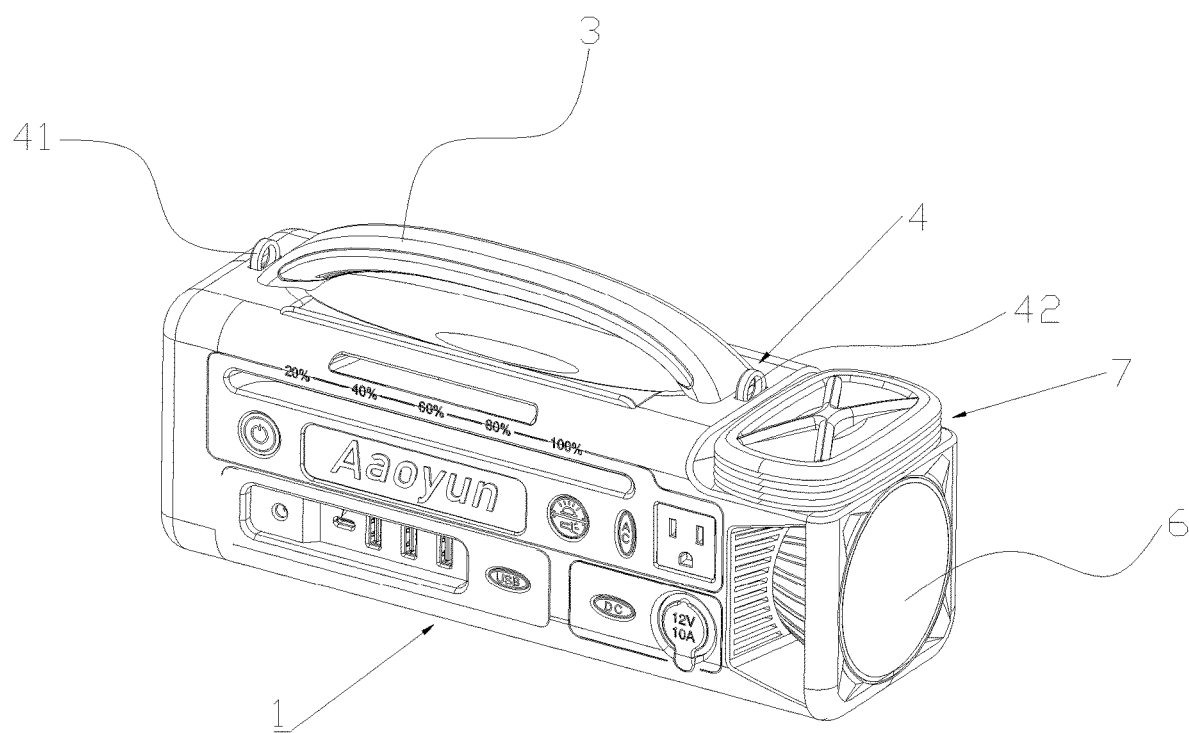
FIG. 2 is a schematic diagram of an overall structure when a strap is separated from a power supply main body.
Figure 3:
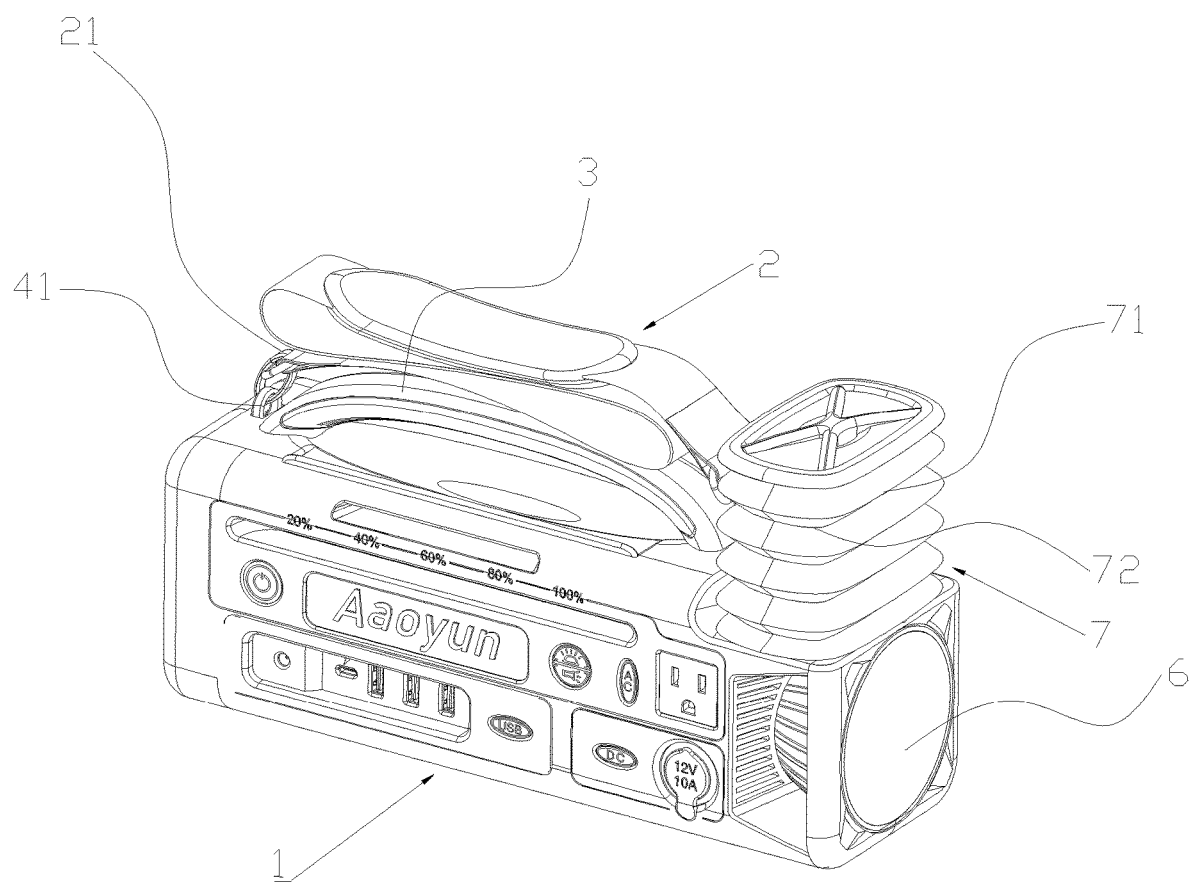
FIG. 3 is a schematic diagram of an overall structure of a lampshade in an unfolded state.
Figure 4:
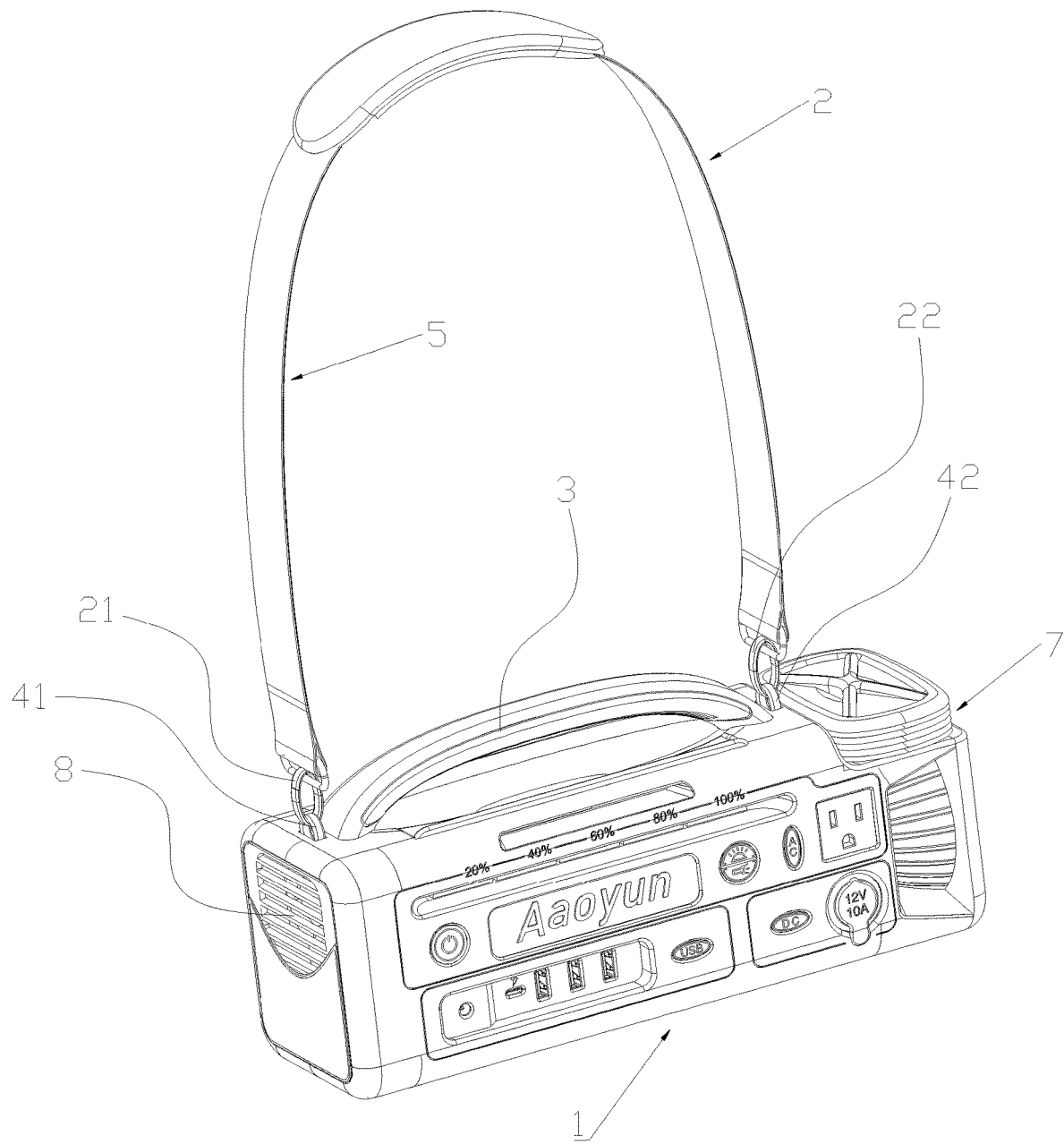
FIG. 4 is a schematic diagram of an overall structure of a lampshade in a folded state.

Referring to FIG. 1 to FIG. 4, the energy storage power supply includes a power supply main body 1 and a strap 2. The power supply main body 1 is provided with a handle 3; a hanging part 4 is arranged at the handle 3; and the strap 2 is detachably connected to the hanging part 4. By the above structure, the energy storage power supply includes the power supply main body and the strap; the power supply main body is provided with the handle; the hanging part is arranged at the handle; and the strap is detachably connected to the hanging part. Therefore, a user can not only carry the energy storage power supply with the handle, but also easily carry the energy storage power supply with the strap; furthermore, the strap is connected to the hanging part at the handle, so that when slinging the energy storage power supply over the shoulder with the strap, the user can enclasp the handle under the help of an arm to fix the position of the energy storage power supply, prevent the energy storage power supply from swinging during moving of the user, and avoid the energy storage power supply from sliding off from the shoulder of the user; the stability and the safety are high; moreover, the shoulder and the arm of the user are simultaneously stressed, so that the strength of the body can be fully mobilized, and it is labor-saving; the phenomenon of partial muscle ache can be effectively prevented, and the user can carry the energy storage power supply for a long time; and when the user needs to free up hands for other work, the energy storage power can be slung across the body through the strap to prevent slipping off.

The hanging part 4 includes a first hanging opening 41 formed in one end of the handle 3, and a second hanging opening 42 formed in the other end of the handle 3; and one end of the strap 2 is detachably connected to the first hanging opening 41, and the other end of the strap 2 is detachably connected to the second hanging opening 42, so as to form a hanging space 5 for hanging by a user between the strap 2 and the handle 3. One end of the strap 2 is provided with a first hanging buckle 21, and the other end of the strap 2 is provided with a second hanging buckle 22; one end of the strap 2 is detachably connected to the first hanging opening 41 through the first hanging buckle 21; and the other end of the strap 2 is detachably connected to the second hanging opening 42 through the second hanging buckle 22. By the above structure, the energy storage power supply is reasonable in design, simple in structure and stable in connection, and detachable connection between the strap and the hanging part is effectively achieved; furthermore, the strap and the hanging part are detachably connected, so that mounting and storage are facilitated. For example, when the user needs to carry the energy storage power supply, the first hanging buckle of the strap can be connected to the first hanging opening, and the second hanging buckle of the strap is connected to the second hanging opening, so as to form the hanging space for hanging by the user between the strap and the handle, and the user can sling the energy storage power supply over the shoulder through the hanging space, or sling the energy storage power supply across the body; when the user needs to store the energy storage power supply, the first hanging buckle of the strap can be separated from the first hanging opening, and the second hanging buckle of the strap can be separated from the second hanging opening, so as to separate the strap from the handle; and the energy storage power supply and the strap are respectively stored. The first hanging opening and the second hanging opening are respectively arranged at two ends of the handle, so that when the user slings the energy storage power supply over the shoulder with the strap, the user enclasps the handle under the help of the arm, so as to fix the position of the energy storage power supply, prevent the energy storage power supply from swinging during moving of the user, and avoid the energy storage power supply from sliding off from the shoulder of the user.

An adjustment device is further arranged on the strap to adjust the length of the strap. By the above structure, the user can adjust the length of the strap through the adjustment device, so that the strap can adapt to the figure of the user, which greatly improves the generality and adaptability of the energy storage power supply.

A light-transmitting lampshade 7 and a night lamp are further arranged on the power supply main body 1; the lampshade 7 is foldable; and the night lamp is arranged in the lampshade 7. A longitudinal cross section of the lampshade 7 is a waveform, and the lampshade 7 is foldable at a wave crest 71 and wave trough 72 of the waveform. By the above structure, since the lampshade is foldable at the wave crest and the wave trough, a folding function of the lampshade is realized. When the lampshade is in an unfolded state, the lighting brightness of the night lamp is adjusted; and furthermore, since the lampshade is foldable, when the user needs to store the energy storage power supply, the lampshade can be folded to a folded state to reduce the volume of the energy storage power supply and facilitate the storage.

A flashlight 6 is further arranged on the power supply main body 1, and the flashlight 6 is used by a user for lighting. The flashlight 6 is arranged on a side wall of the power supply main body 1. Specifically, the handle 3 is arranged on a top wall of the power supply main body 1; the night lamp and the lampshade 7 are arranged on one side of the handle 3; and the night lamp and the lampshade 7 are located above the flashlight 6. By the above structure, the arrangement of the flashlight, the night lamp and the lampshade is effectively achieved; furthermore, since the flashlight is arranged on the side wall of the power supply main body, when the user slings the energy storage power supply over the shoulder and moves, the position of the energy storage power supply can be controlled under the help of the arm to control the irradiation position of the flashlight to illuminate a far distance; furthermore, the lampshade is arranged on the night lamp, so that light emitted by the night lamp arranged above the flashlight can be scattered after passing through the lampshade to illuminate places around the energy storage power supply; and moreover, the light is soft and not dazzling, which can create a comfortable and safe mood, so that the user experience is further improved.

A storage bag 8 is further arranged on a side wall of the power supply main body 1. The storage bag 8 is a storage string bag. By the above structure, the user can store belongings through the storage bag, and conveniently pick and place the belongings, so it further improves the user experience.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. An energy storage power supply, comprising a power supply main body and a strap, wherein the power supply main body is provided with a handle; a hanging part is arranged at the handle; and the strap is detachably connected to the hanging part,
    wherein a light-transmitting lampshade and a night lamp are further arranged on the power supply main body; the lampshade is foldable; and the night lamp is arranged in the lampshade.

2. The energy storage power supply according to claim 1, wherein the hanging part comprises a first hanging opening formed in one end of the handle, and a second hanging opening formed in the other end of the handle; and one end of the strap is detachably connected to the first hanging opening, and the other end of the strap is detachably connected to the second hanging opening, so as to form a hanging space for hanging by a user between the strap and the handle.

3. The energy storage power supply according to claim 2, wherein one end of the strap is provided with a first hanging buckle, and the other end of the strap is provided with a second hanging buckle; one end of the strap is detachably connected to the first hanging opening through the first hanging buckle; and the other end of the strap is detachably connected to the second hanging opening through the second hanging buckle.

4. The energy storage power supply according to claim 1, wherein a longitudinal cross section of the lampshade is a waveform, and the lampshade is foldable at a wave crest and wave trough of the waveform.

5. The energy storage power supply according to claim 4, wherein a flashlight is further arranged on the power supply main body, and the flashlight is used by a user for lighting.

6. The energy storage power supply according to claim 5, wherein the flashlight is arranged on a side wall of the power supply main body.

7. The energy storage power supply according to claim 6, wherein the handle is arranged on a top wall of the power supply main body; the night lamp and the lampshade are arranged on one side of the handle; and the night lamp and the lampshade are located above the flashlight.

8. The energy storage power supply according to claim 1, wherein a storage bag is further arranged on a side wall of the power supply main body.

9. The energy storage power supply according to claim 8, wherein the storage bag is a storage string bag.

* * * * *